United States Patent
Cartwright

(10) Patent No.: US 8,580,118 B2
(45) Date of Patent: Nov. 12, 2013

(54) WATER SOFTENER SYSTEM USING NANOFILTRATION TO RECLAIM A PORTION OF THE REGENERATING SODIUM CHLORIDE

(76) Inventor: Peter S. Cartwright, Bloomington, MN (US)

( * ) Notice: Subject to any disclaimer, the term of this patent is extended or adjusted under 35 U.S.C. 154(b) by 439 days.

(21) Appl. No.: 12/842,644

(22) Filed: Jul. 23, 2010

(65) Prior Publication Data

US 2010/0282677 A1    Nov. 11, 2010

Related U.S. Application Data

(63) Continuation-in-part of application No. 10/587,955, filed as application No. PCT/US2005/002537 on Jan. 28, 2005, now abandoned.

(60) Provisional application No. 60/540,396, filed on Jan. 30, 2004.

(51) Int. Cl.
*B01D 61/22* (2006.01)
*C02F 1/58* (2006.01)
*B01D 65/02* (2006.01)
*C02F 5/00* (2006.01)

(52) U.S. Cl.
USPC ........... 210/636; 210/650; 210/651; 210/739; 210/637

(58) Field of Classification Search
None
See application file for complete search history.

(56) References Cited

U.S. PATENT DOCUMENTS

| | | | | |
|---|---|---|---|---|
| 3,216,450 A | * | 11/1965 | Timmons | ................ 137/599.15 |
| 4,275,448 A | | 6/1981 | Le Dall | |
| 4,321,137 A | | 3/1982 | Kohler | |
| 4,387,026 A | | 6/1983 | Woolacott | |
| 5,254,257 A | | 10/1993 | Brigano et al. | |
| 6,004,464 A | | 12/1999 | Lien | |
| 6,106,722 A | | 8/2000 | Chew et al. | |
| 6,666,971 B2 | | 12/2003 | Chen | |
| 7,132,052 B2 | | 11/2006 | Rawson et al. | |
| 2003/0052060 A1 | | 3/2003 | Teel, Jr. | |

* cited by examiner

*Primary Examiner* — Katherine Zalasky
(74) *Attorney, Agent, or Firm* — Nawrocki, Rooney & Sivertson, P.A.

(57) ABSTRACT

A water softening system includes apparatus and process that recycles a substantial percentage of the brine. This system conventionally includes a brine tank and a softening tank through which hard water from a source passes during normal operation. During the regeneration cycle, the brine solution in the brine tank passes through the softening tank acquiring hardness ions, and then through a nanofilter that passes a much higher proportion of the brine ions than the hardness ions. The hardness ions flow from the upstream end of the nanofilter into a drain. The liquid passing through the nanofilter contains salt that returns to the brine tank for reuse. A preferred embodiment includes a pump to force the brine solution through the nanofilter and a throttling valve connecting the upstream side of the nanofilter to a drain, and through which the hardness ions flow.

10 Claims, 1 Drawing Sheet

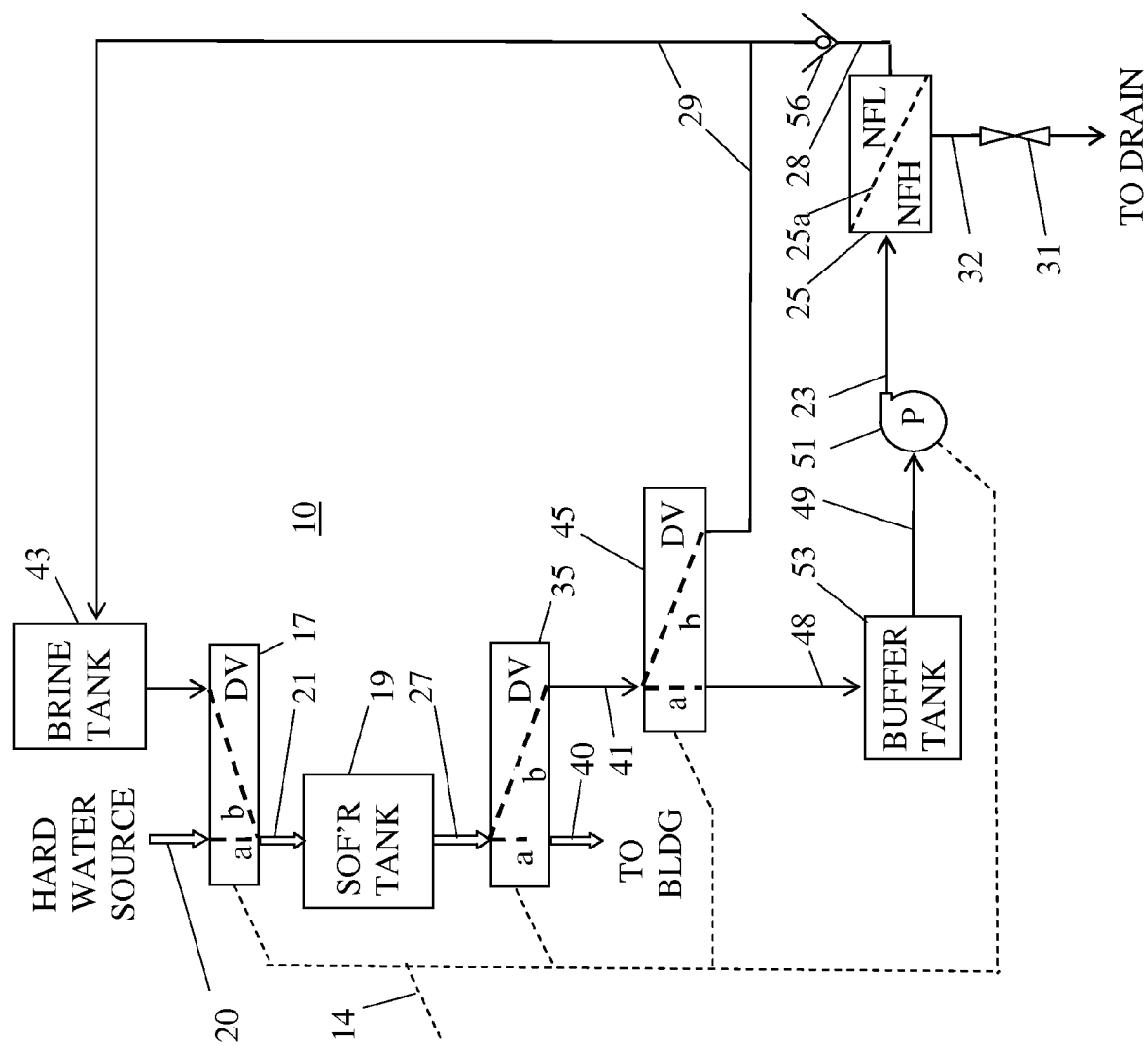

WATER SOFTENER SYSTEM USING NANOFILTRATION TO RECLAIM A PORTION OF THE REGENERATING SODIUM CHLORIDE

This is a continuation-in-part application filed under 37 CFR §53(b) claiming priority under 35 U.S.C. §120 of U.S. patent application Ser. No. 10/587,955 having a 371(c) filing date of Jul. 31, 2006 now abandoned which is a U.S. national election consistent with 35 U.S.C. §363 of international patent application Ser. No. PCT/US05/02537 filed Jan. 28, 2005 claiming priority under 35 U.S.C. §119(e) (1), of Provisional Application Ser. No. 60/540,396, having a filing date of Jan. 30, 2004, each of which is incorporated herein by reference in their entireties.

FIELD OF THE INVENTION

The present invention relates to water softening systems. In particular, the present invention relates to a water softening system having a filtration system that separates hardness ions from brine so that the brine can be recycled instead of being discharged with the hardness ions.

BACKGROUND OF THE INVENTION

Among industrialized nations of the world, there is a growing concern for, and emphasis on, environmentally responsible practices. For example, more and more governments and communities are interested in minimizing the kinds and quantities of chemicals that are deposited into water systems, including wastewater systems. A common form of wastewater pollution is the brine solution discharged into sewers or septic systems during typical regeneration processes of water softeners.

For the last fifty years or so, water softening has become widely used in those regions where water supplies contain high concentrations of calcium and magnesium, and are therefore considered "hard". Utilizing a sodium ion exchange process, resin-based water softeners are installed on water lines, particularly those leading into residences, to soften most if not all of the water used inside such homes. As a water supply passes through ion exchange resins inside a water softener, the calcium and magnesium ions bond to the resins and are removed from the water flow.

Periodically, these ion exchange resins must be regenerated. Typically this regeneration is accomplished utilizing a brine solution such as sodium or potassium chloride. In a typical regeneration process, the brine solution is slowly pumped through the resin bed. Through a chemical exchange process, the calcium and magnesium ions which were adsorbed onto the resin are stripped off and replaced with sodium or potassium ions. At the conclusion of this process, the "spent" brine solution containing both the hardness ions and the brine is discharged into the sewer or septic system. This discharge has serious long-term effects on the environment, as the brine salinity, total dissolved solids, and/or chloride cause corrosion in the sewage system, and contaminate the planet's fresh water supplies.

Presently, because this pollution problem has defied resolution by economically acceptable means, some communities are resorting to banning or limiting water softening in homes. For example, on Oct. 12, 2009, California governor Arnold Schwarzenegger signed into law, a bill giving local California water agencies the authority to restrict or even to ban the use of water softeners using on-site salt-based regeneration.

Scientific studies such as one conducted by Santa Clarita, Calif. are finding that brine solution discharged from water softeners is a significant source of water pollution. This finding supports prohibitions of, or restrictions on, current commercially available water softening systems. Consequently, removing the salts from the spent brine solution before the solution is discharged has become an immediate and real concern both for communities that want soft water and for water softener manufacturers.

SUMMARY OF THE INVENTION

The present invention relates to an improved water softener system comprising apparatus and a process by which the apparatus operates, to separate hardness ions from brine solution in a way to allow most of the brine solution to be reclaimed, thereby reducing the discharge of brine into the environment.

Nanofiltration (NF) is a pressure driven, membrane separation technology that separates ionic solute from water supplies based on the ionic charge of the solute. Preferred embodiments of the present invention include a pump that supplies the force required to effect the separation and the feeding of a brine solution or feed stream into a housing containing a nanofilter membrane element.

In the NF process, multivalent salts are rejected to a higher degree than monovalent salts. Thus, NF used as part of a water softener system can be used to selectively remove the multivalent hardness ions from a brine solution and direct them to a drain while monovalent salts that make up the brine solution are recycled to a water softener brine tank. With the present invention, approximately 90% or more of the brine solution that typically is discharged into a drain can be recovered and recycled, thereby minimizing water pollution as well as the cost of water softener salt from which brine solution is prepared.

The softener system of the invention has normal and regeneration modes. During normal mode, hardness ions exchange positions with salt ions held onto the resin particles. When most of the salt on the resin particles has been replaced with hardness ions, the softener system goes into regeneration mode.

The invention's regeneration mode has two phases of operation that are modifications of the current industry standard. These modifications substantially reduce the amount of salt discharged into the drain during regeneration.

In regeneration mode, during a first brine/slow rinse phase, the system uses modified diverter valves to direct the effluent during this phase through a nanofilter to the brine tank. During a later fast rinse phase, at least a portion of the water in the softener tank that has dissolved salt may also be directed to the brine tank.

The system is also compatible with a further improvement that, while the softener is in normal mode, allows the nanofilter to process the contents of the brine tank, removing and discharging any remaining hardness ions in the brine tank.

The invention in one version comprises a process for regenerating a water softening system that recycles a substantial percentage of the softener salt. This process removes multivalent ions from water provided by a hard water source.

Such a process operates in a water softening system that conventionally includes a softening tank through which the water from the source passes from an upstream to a downstream end. The system also conventionally includes a brine tank for holding a monovalent regenerating brine solution.

A functionally conventional first diverter valve supplies liquid selectively from one of the water source and the brine tank to the upstream end of the softening tank.

The improved system includes a nanofilter having upstream and downstream sides allowing monovalent ions to pass to the downstream side and retains multivalent ions on the upstream side. Liquid which passes through the NF membrane carries mainly monovalent ions and is directed to the brine tank. The liquid that does not pass through the nanofilter is rich in bivalent hardness ions and flows to the drain. Most of the salt in the liquid from the softening tank, being monovalent, passes through the nanofilter rather than entering the drain.

A second diverter valve connects between the downstream end of the softening tank and selectively to either the upstream side of the nanofilter or to a water distribution system. A connection between the downstream side of the nanofilter and the brine tank allows liquid carrying mainly salt to return to the brine tank.

The process comprises the steps of operating the first diverter valve to pass brine solution from the brine tank through the softening tank of the water softening system and operating the second diverter valve to direct liquid from the downstream end of the softening tank to the nanofilter. Liquid on the downstream side of the nanofilter flows to the brine tank. Liquid on the upstream side of the nanofilter flows to the drain.

A conventional softener system can incorporate the improved NF system with the following modifications. The softener valve will direct the effluent from the brine/slow rinse phase to a buffer tank. The softener valve may direct some or all of the effluent from the fast rinse cycle directly back to the brine tank. The amount of fast rinse liquid directed to the brine tank may be based on a predetermined degree of salinity of this solution.

The invention is an improved process and apparatus for regenerating a water softening system of the type that removes multivalent (hardness) ions from water. The improvement reclaims and reuses brine in the solution carrying the hardness ions by separating the hardness ions from that solution.

The water softening system includes a softening tank through which the water to be softened passes from an upstream to a downstream end; a brine tank for holding a monovalent regenerating salt solution; a first diverter valve connected between the bottom of the brine tank and the upstream end of the softening tank; a nanofilter having upstream and downstream sides which permits selective passage of monovalent (i.e. salt) ions and prevents passage of bivalent (i.e. hardness) ions; and a second diverter valve linking the downstream end of the softening tank selectively to the user or building plumbing and to the upstream side of the nanofilter;

The improved regeneration process comprises the step of first conventionally operating the first diverter valve to pass brine solution from the brine tank through the softening tank of the water softening system. At the same time, the process operates the second diverter valve to direct liquid from the downstream end of the softening tank to the upstream side of the nanofilter.

Preferably, the water softening system includes a pump which receives the liquid carrying both brine and hardness ions from the softener tank and a throttling valve connected between the upstream side of the nanofilter and a drain. The pump pressurizes the softener tank liquid and supplies same to the nanofilter. The pump may be powered concurrently with operating the second diverter valve to direct liquid from the downstream end of the softening tank to the nanofilter.

The throttling valve maintains a relatively high pressure on the upstream side of the nanofilter so that a substantial volume of liquid is forced through the nanofilter. The liquid that does not pass through the nanofilter and that flows to the drain is rich in bivalent hardness ions and has a small amount of salt dissolved therein.

Although the preferred embodiments of the NF water treatment system for water softeners have been described herein, it should be recognized that numerous changes and variations can be made to these embodiments, which changes and variations are still within the scope and spirit of the present invention. The present invention should not be unduly limited by the illustrative embodiments and examples set forth herein for exemplary purposes. Rather, the scope of the present invention is to be defined by the claims.

BRIEF DESCRIPTION OF THE DRAWING

FIG. 1 is a diagram of a water softener system including NF water treatment allowing reuse of the softener salt.

DETAILED DESCRIPTION OF THE INVENTION

Referring to FIG. 1, a water softening system 10 according to the invention conventionally includes a connection to a source 20 of hard water to be softened such as a municipal water main or a well. During a normal operating mode or cycle, water from source 20 is directed to an input connection of a softener tank 19. Tank 19 contains resin particles on which hardness ions in the water adsorb to soften the water as it flows through tank 19. The softened water from tank 19 is then supplied to a user such as a building through a plumbing connector 40.

Also conventionally, system 10 operates in addition to the normal mode, in a regeneration mode. The regeneration mode has a first slow rinse phase during which bivalent hardness ions adsorbed onto the resin particles are replaced by monovalent salt ions by flow of brine from a brine tank 43. A fast rinse phase follows the slow rinse phase, during which salt remaining in the liquid within softening tank 19 is flushed from tank 19.

First and second diverter valves 17 and 35 control the operating mode in a conventional softening system. First diverter valve 17 has first and second inputs to "a" and "b" paths, from source 20 and brine tank 43 respectively. Valve 17 selectively directs the liquid from the selected input to an output 21 as specified by a schematically shown controller 14. Controller 14 may be nothing more than a clock sequencer or may comprise a microprocessor.

Second diverter valve 35 receives liquid from softener tank 19 in pipe 27 at an input, and selectively directs this liquid along "a" and "b" paths to first and second outputs respectively as specified by a schematically shown controller 14. In a conventional system, the "b" or second output of valve 35 flows to a drain. In both a conventional system and in system 10, water flows from the "a" or first output of valve 35 to users through connection 40. In conventional systems, valves 17 and 35 are typically combined in a single physical unit with functionality as shown.

Diverter valves 17 and 35 each have a normal setting during normal operating mode allowing liquid flowing through the path designated as "a". Diverter valve 17, when set for normal mode, allows liquid to flow only from source 20 to softener tank 19. Diverter valve 35, when set for normal mode, allows water to flow only from softener tank 19 to connection 40.

Thus, in normal operating mode, water flows from source 20 to softener tank 19 and from there to connector 40 for distribution to the building.

Closing the "a" paths and opening the "b" paths of valves 17 and 35 starts the regeneration mode and shuts off water flow from source 20 to softener tank 19 and to plumbing connection 40. For this reason, regeneration is preferably done when little or no water usage occurs such as nighttime. Alternatively, the design of diverter valve 17 can directly connect source 20 to connection 40 during regeneration, to provide unsoftened water to users during that time.

The improved softening system 10 shown in FIG. 1 has substantial modifications compared to current systems in the handling of liquid from softening tank 19 during regeneration mode. As mentioned, the regeneration mode has a brine/slow rinse phase and a fast rinse phase. Controller 14 selects the normal and regeneration modes and the two phases of the regeneration mode.

The description hereafter pertains in most to the regeneration mode of system 10. In system 10, diverter valve 35 directs the effluent from the cycle back to brine tank 43 through a nanofilter 25 rather than to a drain. The system 10 also includes additional elements to efficiently reuse or reclaim as much of the regeneration salts as is possible. Thus, system 10 provides for directing much of the liquid flowing from the softening tank 19 during both the slow and fast rinse phases back to brine tank 43. The flow of liquid to brine tank 43 during the fast rinse phase may stop when of salinity of this liquid falls below a predetermined level.

The operating mode in both conventional systems as well as in system 10 is determined by settings of first and second diverter valves 17 and 35, as well that of a newly added third diverter valve 45. The inputs of valve 17 are conventionally connected to water source 20 and brine tank 43, with the output connection to the input or upstream end of tank 19.

Valve 35 has its input connection to the output or downstream end of tank 19 and "a" and "b" paths connected respectively to plumbing connector 40 and to the input of third diverter valve 45.

The structure of third diverter valve 45 is functionally very similar to that of second diverter valve 35. The second output of second diverter valve 35 connects to the input of third diverter valve 45. The first and second outputs of third diverter valve 45 respectively connect to a buffer tank 53 and to an input pipe 29 to brine tank 43. The settings for third diverter valve 45 are controller by controller 14.

During the slow rinse phase, the "b" path of both first and second diverter valves 17 and 35 is open and the "a" path of valve 45 is open. Brine solution from tank 43 flows through softener tank 19 picking up divalent hardness ions such as calcium adsorbed on the resin particles. Liquid comprising this brine/hardness ions solution then flows from the softener tank 19 to buffer tank 53 through valve 35 which then directs the solution with the hardness ions through its path "b" to the "a" path of valve 45, pipe 48, buffer tank 53, and pump 51.

A pump 51 receives liquid from buffer tank 53 and supplies pressurized brine/hardness ions solution liquid in pipe 23 to a nanofilter (NF) 25 having an element 25*a*. Pump 51 increases the pressure of the brine/hardness ions solution to perhaps 100-150 prig. A throttling valve 31 connects the upstream side of nanofilter 25 to a drain. Controller 14 also controls power to pump 51.

Element 25*a* typically comprises a membrane that blocks a substantial percentage of the hardness ions and allows a high percentage of the salt ions to pass through the membrane. The NF membrane element 25*a* has an upstream or high pressure side (indicated as NFH) and a downstream, low pressure side (indicated as NFL) that is at essentially atmospheric pressure. The liquid on the downstream side of nanofilter 25 comprises a liquid permeate stream provided to a pipe 28. The liquid permeate stream has a reduced concentration of the hardness ions, and a relatively high concentration of salt.

The permeate stream returns to brine tank 43 through pipe 28, a check valve 56, and a pipe 29. The absence of the hardness ions in the permeate stream in pipe 28 results from the flow of the brine solution through the NF membrane element 25*a*. Check valve 56 may be integral with nanofilter 25.

Buffer tank 53 may be unnecessary in many systems. In some types of softener systems whose flow of brine through softener tank 19 during slow rinse is greater than the capacity of nanofilter 25, buffer tank 53 may be interposed between valve 45 and pump 51 to allow a suitable flow rate of brine through softening tank 19. Over a period of time, pump 51 then draws down any excess liquid in tank 53.

The liquid that does not pass through the NF membrane element 25*a* has a high concentration of hardness ions (relative to the NFL side of element 25*a*). This concentrate stream thus contains most of the hardness ions in the liquid flowing in pipe 23 and possibly a small amount of brine. Liquid not passing through nanofilter 25 flows through a pipe 32 to throttling valve 31 and from valve 31, to the drain. Throttling valve 31 and membrane 25*a* cooperate to divide flow between membrane element 25*a* and throttling valve 31. Valve 31 may comprise an orifice or other pressure-dropping device.

The high pressure at the NFH side of membrane 25*a* forces a major portion of the pumped liquid through membrane element 25*a*. The pressure drop across both membrane element 25*a* and throttling valve 31 are each approximately equal to each other and to the pump 51 pressure, assuming the brine tank 43 is maintained at approximately atmospheric pressure.

In one preferred embodiment, throttling valve 31 has a flow restrictor whose pressure drop relative to element 25*a* divides the fluid flow in pipe 23 so that approximately 75-95% of the liquid flows through element 25*a* to brine tank 43 and approximately 5-25% flows through throttling valve 31 to the drain. 90% of the flow in pipe 23 reaching pipe 28 is one current preferred value.

Almost all of the bivalent hardness ions in the fluid in pipe 23 will flow through throttling valve 31. Most of the liquid in pipe 23 passes through membrane 25*a* and returns to brine tank 43, thereby substantially reducing both the volume of drain water and the total mass of salt entering the drain. Note that the salt concentration in both pipes 28 and 32 is nearly equal. But since the flow through throttling valve 31 is substantially less than that through nanofilter 25, most of the salt ions in the flow through pipe 23 returns to brine tank 43.

Causing most of the flow in pipe 23 to flow through nanofilter 25 to brine tank 43 dramatically reduces the total amount of salt flowing to the drain.

Preferred embodiments may include pressure gauges and flow meters to monitor performance.

Preferably, the membrane element 25*a* has a spiral-wound configuration, although other configurations are possible, such as capillary fiber, tubular, or plate and frame. A common configuration for such a membrane 25*a* comprises many turns of a strip of membrane material with the edges sealed in some manner to cause the majority of the liquid entering the NFH side to either pass through the membrane 25*a* pores or flow to valve 31.

The following examples, without limitation, are types of NF membrane elements 25*a* that are acceptable for use in the present invention, although their manufacturers may nor may not have their products evaluated for this application: a spiral wound NF-270 membrane made by Dow Filmtec; a spiral-wound XN45 membrane made by TriSep Corp.; a spiral-wound SR2 membrane, by Koch Membrane Systems; a spiral-wound NF membrane using a special polymer, by Hydranautics; and a spiral-wound NF membrane using a special polymer, by GE Osmonics.

Generally, a suitable NF membrane element 25 has a minimum of approximately 90% multivalent salts rejection and a maximum of approximately 20% monovalent salts rejection. If the concentration of the brine solution in tank 43 is maintained above approximately 10%, pH adjustment is usually unnecessary. NF membrane element 25 can remove hardness ions from unmodified brine solution in buffer tank 53. The term "unmodified" in this context refers to brine solution that has not been subjected to pH adjustment or other chemical treatment before passing to NF membrane element 25.

In conventional systems during the fast rinse phase, controller 14 closes the "b" path of valve 17 opens and the "a" path for a period of time. Valve 35 remains with the "a" path closed and the "b" path open. This allows water from source 20 to flush salt-containing liquid from softener tank 19. In a conventional system, this salt-containing liquid flows directly to the drain. Eventually controller 14 sets both valves 17 and 35 to activate their "a" paths, ending the regeneration mode.

The system of FIG. 1 also includes a further improvement relating to the fast rinse phase. During at least the first part of the fast rinse phase of regeneration, controller 14 closes the "a" path of valve 45 and opens the "b" path thereof, allowing a substantial amount of salt-containing water within softener tank 19 to flow directly to tank 43.

This improvement serves two purposes. First of all, the salt rinsed from softener tank 19 during the fast rinse cycle returns to brine tank 43, further reducing the amount of salt sent to the drain. Secondly, at least some of the water lost to the drain during the fast rinse phase of regeneration is replaced, so the overall regeneration process uses less water.

Although the preferred embodiments of the NF water treatment system for water softeners have been described herein, it should be recognized that numerous changes and variations can be made to these embodiments, which changes and variations are still within the scope and spirit of the present invention. The present invention should not be unduly limited by the illustrative embodiments and examples set forth herein for exemplary purposes. Rather, the scope of the present invention is to be defined by the claims.

What is claimed is:

1. A process for regenerating a water softening system, said system of the type that removes multivalent ions from water provided by a hard water source, the water softening system including a softener tank through which the water from the source passes from an upstream end thereof to a downstream end thereof; a brine tank for holding a monovalent regenerating brine solution; a first diverter valve supplying liquid selectively from either the water source or the brine tank to the upstream end of the softener tank; a nanofilter having upstream and downstream sides, and allowing monovalent ions to pass to the downstream side and retaining multivalent ions on the upstream side; a second diverter valve connected to receive liquid from the downstream end of the softener tank and to selectively supply liquid at a first output to a water distribution system and to a second output; a connection between the downstream end of the nanofilter and the brine tank; a pump receiving liquid from the second output of the second diverter valve and supplying pressurized liquid to the upstream side of the nanofilter; a throttling valve connected between the upstream side of the nanofilter and the drain; and a third diverter valve having an input and first and second selectable outputs, said input connected to receive liquid from the second output of the second diverter valve, said first output of the third diverter valve connected to the pump, and said second output of the third diverter valve connected to another destination, said process comprising the steps of:

a) operating the first diverter valve to pass brine solution from the brine tank through the softener tank of the water softening system;

b) operating the second diverter valve to direct liquid from the downstream end of the softener tank to the second output of the second diverter valve;

c) directing liquid on the downstream side of the nanofilter to the brine tank;

d) directing liquid on the upstream side of the nanofilter to a drain;

e) operating the third diverter valve during a first phase of a regeneration cycle to supply liquid from the second output of the second diverter valve to the first output of the third diverter valve; and f) during a second phase of the regeneration cycle which follows the first phase of the regeneration cycle, operating the third diverter valve to direct liquid from the second diverter valve to the second output of the third diverter valve.

2. The process of claim 1, wherein the water softening system includes a buffer tank interposed between the third diverter valve and the pump, and further including the step of operating the second and third diverter valves to direct liquid from the downstream end of the softener tank to the buffer tank during the regeneration cycle.

3. The process of claim 1 including the step of controlling the pressure drop across the first throttling valve to divert to the drain, from 5-25% of the flow to the upstream side of the nanofilter.

4. The process of claim 1, wherein the water softening system includes a buffer tank interposed between the second diverter valve and the pump, and further including the step of operating the second diverter valve to direct liquid from the downstream end of the softener tank to the buffer tank.

5. The process of claim 4, wherein the water softening system further comprises the third diverter valve having an input and first and second outputs, and connected at the input to the second output of the second diverter valve, at the first output to the buffer tank, and at the second output to the brine tank, wherein the process comprises during regeneration, operating the third diverter valve to connect the input thereof to the first output thereof.

6. The process of claim 5 including operating the first diverter valve to supply water from the water source to the softener tank, operating the second diverter valve to direct liquid from the softener tank to the second output of the second diverter valve, and operating the third diverter valve to direct liquid from the input thereof to the brine tank.

7. The process of claim 1, wherein the water softening system further comprises the third diverter valve connected at the first output thereof to the buffer tank, and at the second output thereof to a destination other than the buffer tank, wherein the process comprises during regeneration, operating the third diverter valve to connect the input thereof to the first output thereof.

8. The process of claim 7, wherein the process comprises the step of first operating the third diverter valve to connect the input thereof to the first output thereof, and thereafter operating the third diverter valve to connect the input thereof to the second output thereof.

9. The process of claim 8, wherein the second output of the third diverter valve is connected to the brine tank, said process including the steps of operating the first diverter valve to supply water from the water source to the softener tank, operating the second diverter valve to direct liquid from the softener tank to the second output of the second diverter valve, and operating the third diverter valve to direct liquid from the input thereof to the second output thereof.

10. The process of claim 1, wherein the water softening system includes a connection between the second output of the third diverter valve and the brine tank, and wherein the process further comprises the step during the second phase of the regeneration cycle, of directing liquid from the first input of the third diverter valve to the second output thereof.

* * * * *